United States Patent [19]
Lowery

[11] 4,143,746
[45] Mar. 13, 1979

[54] HAND REEL

[76] Inventor: A. J. Lowery, 867 Sandell, White Settlement, Tex. 76108

[21] Appl. No.: 873,112

[22] Filed: Jan. 30, 1978

[51] Int. Cl.² .................... B65H 75/40; H02G 11/02
[52] U.S. Cl. ..................................... 191/12.4; 242/96
[58] Field of Search ..................... 242/96; 191/12.2 R, 191/12.4; 225/56–61, 66; 244/155 A

[56] References Cited

U.S. PATENT DOCUMENTS

| | | | |
|---|---|---|---|
| 2,469,247 | 5/1949 | Smith | 225/66 |
| 3,006,574 | 10/1961 | Hardy | 242/96 |
| 3,149,764 | 9/1964 | Waltz | 225/57 |

FOREIGN PATENT DOCUMENTS

| | | | |
|---|---|---|---|
| 798141 | 7/1958 | United Kingdom | 242/96 |

*Primary Examiner*—Harvey C. Hornsby
*Assistant Examiner*—John M. Jillions
*Attorney, Agent, or Firm*—Wofford, Felsman, Fails & Zobal

[57] ABSTRACT

A hand reel is disclosed herein particularly for use in winding electrical extension cords. The hand reel is a spool with flanges, with the cord adapted to be wrapped around the spool between the flanges. The spool has a central bore that is large enough to accommodate the user's hand. A supporting member is slidingly attached to the spool inside the bore, allowing the spool to be rotated while holding the supporting member. The arcuate length of the supporting member is much less than the diameter of the bore, minimizing friction and allowing cleaning.

8 Claims, 4 Drawing Figures

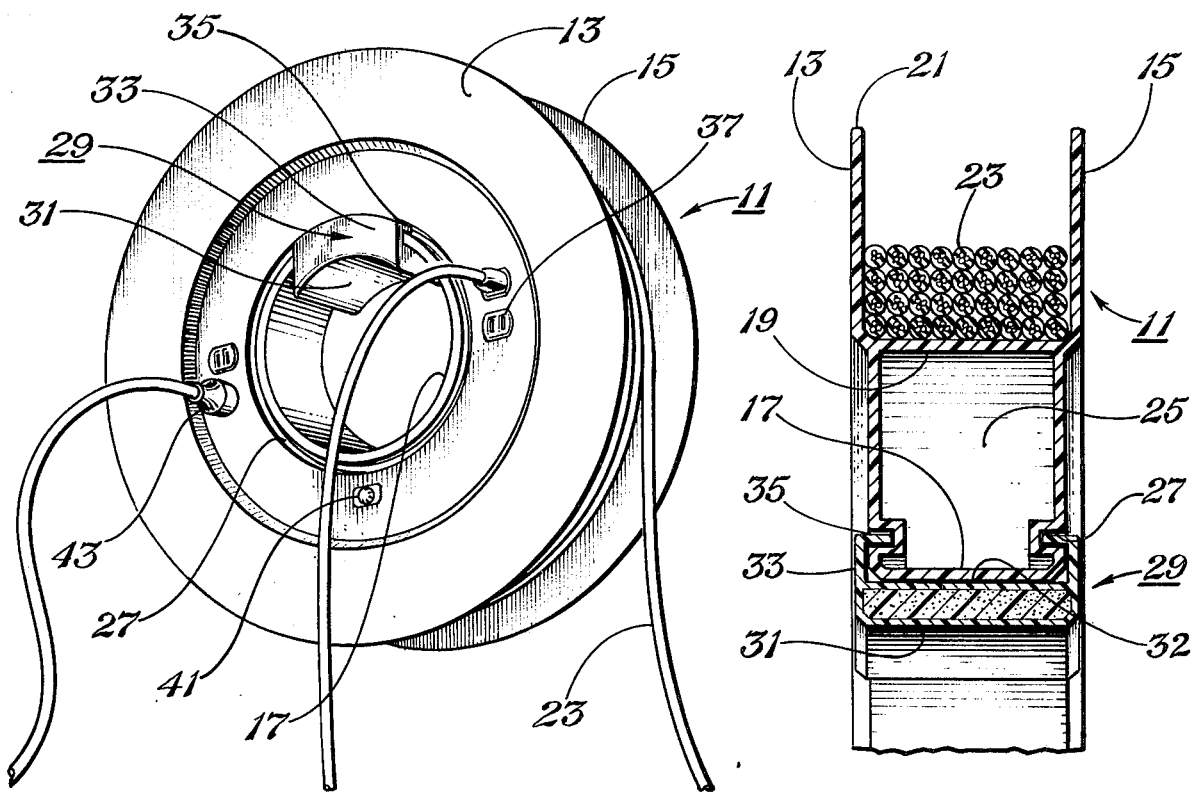
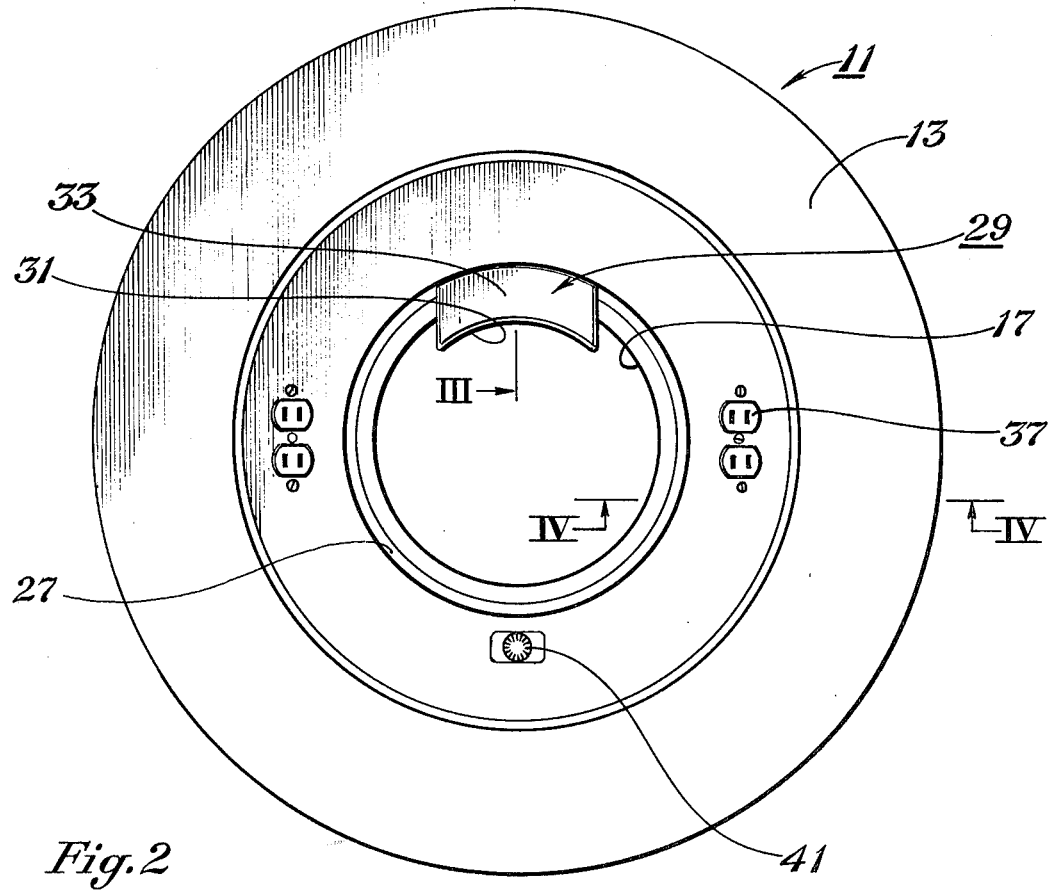

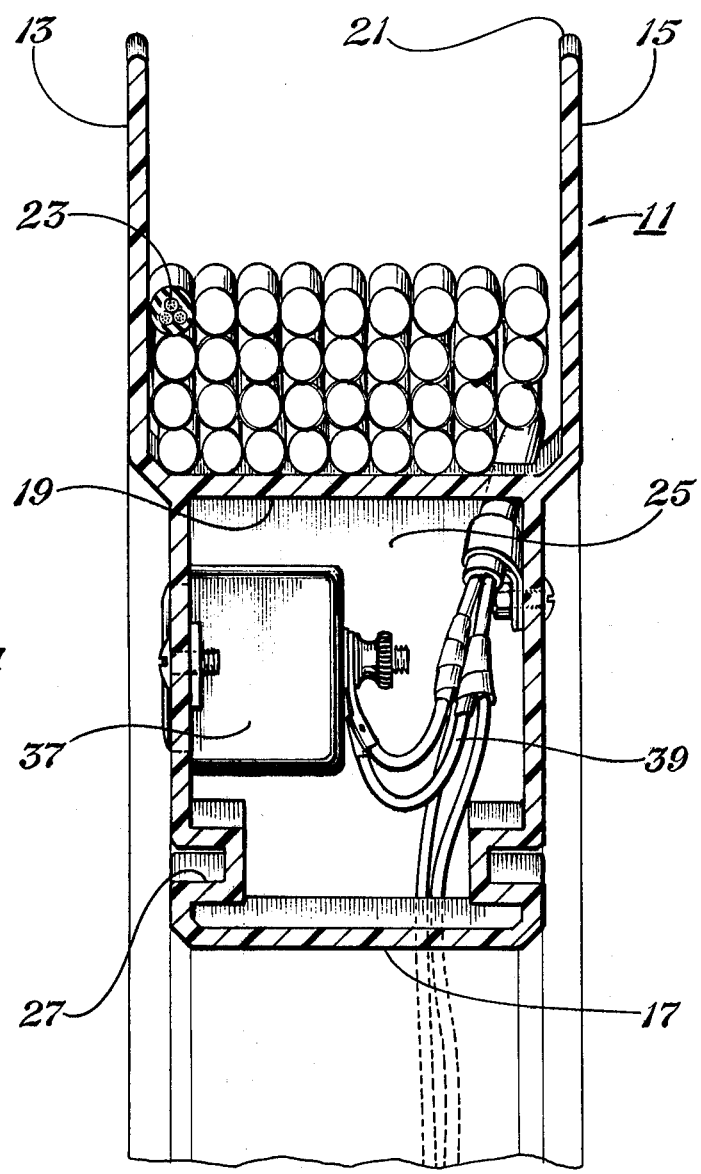

HAND REEL

BACKGROUND OF THE INVENTION

1. Field of the Invention

This invention relates in general to reels for winding line, and particularly to a hand reel for winding electrical extension cords.

2. Description of the Prior Art

There have been many attempts to provide a satisfactory hand reel for electrical extension cords and other types of lines. A rugged compact hand reel for extension cords is particularly needed in residence and building construction industries. The reel should be light weight and trouble free. It should be able to withstand rough treatment as it may be thrown into a truck along with or under heavier equipment. None of the hand reels known to applicant completely satisfy the above requirements.

Some cord reels proposed have axles on which the spool turns, such as shown in U.S. Pat. Nos. 3,837,448 and 3,983,977. The axle of the reel shown in the latter patent protudes to one side, making it cumbersome and subject to being bent or broken. The reel of the other patent is enclosed in a carrying member. Should the line backlash or tangle, the reel would have to be taken apart to untangle the line.

Other reels proposed have a central bore with a cylindrical inner sleeve for the user to support by his hand, such as shown in U.S. Pat. Nos. 3,006,574 and 1,983,565. The latter patent has many more individual parts than desirable. Also, in both of these, the large annular bearing surface is likely to be infiltrated with foreign matter, dirt and debris. This material would increase friction between the inner sleeve and spool and may cause sticking and binding. In order to clean the bearing surfaces, the reels would have to be disassembled.

It is accordingly a general object of this invention to provide an improved hand reel.

It is a further object of this invention to provide an improved hand reel with bearing surfaces that have a minimum amount of friction and are easily cleanable.

It is a further object of this invention to provide an improved hand reel that is compact, simple in construction, and rugged.

For a further understanding of the invention and further objects, features, and advantages thereof, reference may now be had to the following description taken in conjunction with the accompanying drawings.

SUMMARY OF THE INVENTION

In accordance with these objects a hand reel is provided that has a spool with flanges and a channel between them for receiving line. The spool has a bore of sufficient size to accommodate the hand of a user. A supporting member is mounted slidingly inside the bore. The reel is adapted to be held by the supporting member, which allows the spool to rotate with respect to it.

To minimize friction and allow for cleaning of the bearing surface, the load bearing surface of the supporting member is only a segment of an annular surface. The arcuate length of the load bearing surface is considerably less than the circumference of the bore and need be no greater than the average user's hand.

BRIEF DESCRIPTION OF THE DRAWINGS

FIG. 1 is a perspective view of a hand reel constructed in accordance with this invention.

FIG. 2 is a side elevational of the hand reel of FIG. 1.

FIG. 3 is a cross-sectional view of the hand reel of FIG. 1, taken along the line III—III of FIG. 2.

FIG. 4 is an enlarged cross-sectional view of the hand reel of FIG. 1 taken along the line IV—IV of FIG. 2.

DESCRIPTION OF THE PREFERRED EMBODIMENT

Referring to FIGS. 1-3, a hand reel 11 is shown. Hand reel 11 includes a spool with a pair of circular flanges 13, 15 on each end. The spool has a central hub or cylinder 17 open at each end to define a central bore. The inner diameter of cylinder 17 is of sufficient size to accommodate the user's hand. Flanges 13, 15 are of equal diameter and extend outwardly in planes normal to the cylinder's axis of rotation.

A partition 19 extends between the flanges approximately midway between cylinder 17 and the outer edges 21 of the flanges 13, 15. Partition 19 is cylindrical, with cylinder 17 being concentric within it. The outer surface of the partition 19 defines a channel in cooperation with flanges 13, 15 for receiving wraps of an electrical extension cord 23. The inner surface defines a closed chamber 25 in cooperation with flanges 13, 15 and cylinder 17.

Each flange 13, 15 contains an annular depression or groove 27, concentric with the axis of rotation. Groove 27 is rectangular in cross-section and is spaced from cylinder 17 a short distance approximately equal to the width of the groove. A supporting member or slider 29 is slidingly mounted to the hand reel inside cylinder 17. Slider 29 has a lower surface 31 that is adapted to be held by the user's hand while rotating the spool to reel out or wind in the line. Slider 29 has an upper surface 32 (FIG. 3) that is an arcuate segment and is in sliding contact with the inner surface of cylinder 17. The supporting surface 31 is of length approximately the width of the average user's hand. Supporting surface 31 may be curved, flat or various other configurations. Upper surface 32 is of length less than half the circumference of cylinder 17.

As shown in FIG. 3, slider 29 has vertical sides 33 that extend outwardly and have opposing tongues or shoulders 35 on their ends for engaging grooves 27. Sides 33 are parallel with flanges 13, 15 and are in close sliding contact. Shoulders 35 are rectangular and substantially equal to the cross-sectional dimension of groove 27. The height of the sides 33 is selected to provide a small gap above shoulders 35 so that they will not bear the weight of the reel.

One or more electrical receptacles 37 are mounted inside chamber 25 with the outer face substantially flush with the outer side of flanges 13, 15, as shown in FIG. 4. The electrical cord inner end 39 is connected to the receptacles 37 to energize them when plugged in. The receptacle 37 serves as means for providing electrical access to the inner end of the cord. A pilot light 41 is also mounted to one of the flanges 13, 15 to indicate when the receptacles 37 are energized.

Although the spool is shown as an integral piece, it is manufactured in two parts and connected together by screws, other fasteners or adhesive. The receptacles 37 are mounted and connected to the cord end 39 while the spool is still in two separate components. Slider 29 is of single piece or two-piece construction suitably fastened together. Preferably the hand reel is molded from high impact plastic. The slider may contain filler material of different composition, as shown.

In operation, the electrical cord plug is connected to a power source. The user then grasps the slider 29 with one hand, and allow the line to reel out as he walks away from the power source receptacle. Once the desired distance has been reached, other electrical cords 43 may be plugged into the receptacles 37. Cords 43 may be shorter extension cords, or may be lines leading to power tools. The cord is wound in by spinning the flanges 13, 15 with one hand, while holding the slider 29 with the other. Once wound in, the plug to cord 23 is clipped to one of the flanges. If desired, a small folding knob to facilitate rotation may be connected to one of the flanges 13, 15.

It should be apparent that an invention having significant advantages has been provided. The hand reel is simple in construction, compact, and rugged. The slider mechanism allows the reel to be easily rotated, yet avoids axles or enclosures. Friction is minimized by the short arcuate length of the upper bearing surface of the slider, which need be no longer than the width of an average user's hand. If desired, friction could further be reduced by the use of annular ribs or protrusions formed in the bearing surfaces 17, 32. The segmental length of the slider allows the groove and inner surface of the spool cylinder to be easily wiped free of foreign matter to prevent sticking or binding. Since the cord storage area is exposed, should the cord tangle, it can be untangled without opening the reel. The chamber for the receptacles provides a clean environment for the connections.

While the invention has been shown in only one of its forms, It should be apparent to those skilled in the art that it is not so limited but susceptible to various changes and modifications without departing from the spirit or scope thereof.

I claim:

1. An improved hand reel for an electrical extension cord, comprising:
   a spool having circular flanges with a channel therebetween for receiving the cord, and a bore therein of sufficient size to accommodate the hand of the user; the flanges being of the same diameter;
   a supporting member slidingly mounted to the spool inside the bore to allow rotation of the spool with respect to the supporting member for winding on and off the cord; the supporting member having a surface within the bore adapted to be held by the hand of the user and extending along the periphery of the bore for a length substantially less than the circumference of the bore; means for connecting said supporting member to said spool to retain said supporting member in sliding contact with said spool, and
   means for providing electrical access to the inner end of the cord.

2. The hand reel according to claim 1 wherein the length of the supporting member is less than half the circumference of the bore.

3. The hand reel according to claim 1 wherein the supporting member has vertical sides that are slidingly mounted to the flanges of the spool by tongue and groove means.

4. The hand reel according to claim 1 wherein the supporting member has an arcuate upper surface that slidingly contacts the surface of the bore for supporting the weight of the reel and cord.

5. An improved hand reel, comprising:
   a spool having flanges with a channel therebetween for storing line, and a bore therein of sufficient size to accommodate the hand of a user; and
   a supporting member slidingly mounted to the spool inside the bore to allow rotation of the spool with respect to the supporting member; the supporting member having a lower surface adapted to be held by the hand of a user and a pair of vertical sides, each side extending parallel to and slidingly interconnected with one of the flanges by tongue and groove means; the supporting member having an upper surface in sliding contact with the inner surface of the bore that is a segment of length less than half the circumference of the bore.

6. The hand reel according to claim 5 wherein the tongue and groove means comprises an annular depression formed in each flange adjacent the bore concentric with the axis of rotation, and a pair of opposing shoulders formed on the sides of the supporting member for reception in the depressions.

7. An improved hand reel for an electrical extension cord, comprising:
   a cylinder having opens ends with circular flanges extending outwardly from the cylinder's ends, the cylinder being of sufficient diameter to accommodate the hand of a user;
   an annular partition connected between the flanges and positioned between the cylinder and the outer edges of the flanges to define a channel for storing an electrical cord, the space between the cylinder and partition defining a chamber;
   a supporting member slidingly mounted inside the cylinder; the supporting member having a lower surface adapted to be held by the hand of the user and an upper surface in sliding contact with the inner surface of the cylinder; the supporting member further having a pair of vertical sides extending from the upper and lower surfaces, each side extending parallel to and slidingly interconnected to one of the flanges by tongue and groove means; the upper surface of the supporting member being arcuate and substantially less in length than the inner circumference of the cylinder; and
   an electrical receptacle connected to the end of the electrical cord and mounted in the chamber to one of the flanges with its face substantially flush with the flange.

8. An improved hand reel, comprising:
   a spool having flanges with a channel therebetween for receiving line, and a bore therein of sufficient size to accomodate the hand of the user; and
   a supporting member slidingly mounted to the spool inside the bore to allow rotation of the spool with respect to the supporting member for winding on and off the line, the supporting member having a lower surface inside the bore adapted to be grasped by the hand of the user and extending along the periphery of the bore for a length substantially less than the circumference of the bore and means for connecting said supporting member to said spool to retain said supporting member in sliding contact with said spool.

* * * * *